(12) United States Patent
Roethling et al.

(10) Patent No.: US 12,134,550 B2
(45) Date of Patent: Nov. 5, 2024

(54) METHOD FOR TRANSPORTING A GOODS CARRIER BY MEANS OF AN INDUSTRIAL TRUCK OPERABLE IN AN AT LEAST PARTIALLY AUTOMATED MANNER

(71) Applicant: Robert Bosch GmbH, Stuttgart (DE)

(72) Inventors: Frank Roethling, Stuttgart (DE); Patrick Strouhal, Murrhardt (DE)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 17/501,010

(22) Filed: Oct. 14, 2021

(65) Prior Publication Data
US 2022/0119236 A1    Apr. 21, 2022

(30) Foreign Application Priority Data

Oct. 19, 2020  (DE) ...................... 10 2020 213 124.4

(51) Int. Cl.
| | |
|---|---|
| *B66F 9/06* | (2006.01) |
| *B66F 9/075* | (2006.01) |
| *G05D 1/00* | (2024.01) |

(52) U.S. Cl.
CPC ............ *B66F 9/063* (2013.01); *B66F 9/0755* (2013.01); *G05D 1/0231* (2013.01)

(58) Field of Classification Search
CPC .......... B66F 9/063; B66F 9/0755; B66F 9/24; G05D 1/0231; G05D 2201/0216; G06Q 10/08; G06Q 50/28
See application file for complete search history.

(56) References Cited

U.S. PATENT DOCUMENTS

| | | | |
|---|---|---|---|
| 2011/0216185 A1* | 9/2011 | Laws ....................... | H04N 7/18 348/121 |
| 2012/0191272 A1* | 7/2012 | Andersen ............. | G06Q 10/087 705/28 |
| 2017/0121159 A1* | 5/2017 | Weiss ....................... | B62B 3/06 |
| 2020/0207250 A1* | 7/2020 | Jarvis ................. | G01C 21/3623 |

(Continued)

FOREIGN PATENT DOCUMENTS

| | | |
|---|---|---|
| DE | 100 39 507 A1 | 2/2002 |
| DE | 20 2014 102 274 U1 | 7/2014 |

(Continued)

OTHER PUBLICATIONS

"Safety of industrial trucks—Driverless trucks and their systems," DIN EN 1525, Sep. 1997, European Committee for Standardization (21 pages).

*Primary Examiner* — Babar Sarwar
(74) *Attorney, Agent, or Firm* — Maginot, Moore & Beck LLP

(57) ABSTRACT

The disclosure relates to a method for transporting a goods carrier by means of an industrial truck operable in an at least partially automated manner, in which at least the following steps are carried out in an automated manner by the industrial truck: a) acquiring an item of information about the length of the goods carrier, b) checking the acquired information about the length of the goods carrier in relation to a total length of a cargo surface of a cargo platform of the industrial truck, and c) carrying out a multistep loading process or unloading process, comprising at least reloading the goods carrier on the cargo platform if the length of the goods carrier is less than the total length of the cargo surface.

18 Claims, 5 Drawing Sheets

(56) References Cited

U.S. PATENT DOCUMENTS

2020/0299117 A1* 9/2020 Sperlich ................ B66F 9/0755
2020/0317490 A1* 10/2020 Flottran ................ B66F 9/0755

FOREIGN PATENT DOCUMENTS

| DE | 10 2019 107 096 A1 | 10/2020 |
| EP | 2 385 014 A1 | 11/2011 |
| EP | 3 251 918 A1 | 12/2017 |
| EP | 3 369 696 A1 | 9/2018 |
| JP | 2019-199331 A | 11/2019 |

* cited by examiner ated manner. Furthermore, a com-
METHOD FOR TRANSPORTING A GOODS CARRIER BY MEANS OF AN INDUSTRIAL TRUCK OPERABLE IN AN AT LEAST PARTIALLY AUTOMATED MANNER This application claims priority under 35 U.S.C. § 119 to application no. DE 10 2020 213 124.4, filed on Oct. 19, 2020 in Germany, the disclosure of which is incorporated herein by reference in its entirety.

TECHNICAL FIELD

The disclosure relates to a method for transporting a goods carrier by means of an industrial truck operable in an at least partially automated manner. Furthermore, a computer program, a machine-readable storage medium, a control unit, and an industrial truck are specified. The disclosure can be used in particular for the most space-saving possible storage of 400 mm and 600 mm dollies (goods carriers).

BACKGROUND

Industrial trucks operable in an at least partially automated or even autonomous manner are known, these can generally also be referred to as (automated or autonomous) industrial trucks (automated guided vehicles; abbreviated: AGVs). Corresponding industrial trucks are defined, for example, in EN 1525. To be able to implement the safest possible transport, the transport material, which is typically stored in a goods carrier (in the relevant field also often referred to as a "dolly"), is to be transported as close as possible to the center of gravity of the industrial truck.

In industrial trucks having an elevated front structure (relative to the cargo surface or cargo platform), the goods carrier is typically to be loaded so that its front end face is arranged (in the most formfitting possible manner) on or at least as close as possible to the rear side or the rear end wall of the front structure or adjoins thereon, whereby tipping over forward and/or damaging the cargo (the transport material in the goods carrier) is to be prevented as much as possible in the event of an emergency stop and/or abrupt braking process in the travel direction.

Therefore, sensors in or on the industrial truck, which are used to monitor the correct positioning of the goods carrier on the cargo platform, are advantageous for automated operation, which generally also comprises automated loading processes. In this context, at least two cargo platform sensors spaced apart from one another in the longitudinal direction are often used. This describes sensors which are arranged in and/or on the cargo platform to acquire the positioning of the goods carrier on the cargo platform. Corresponding sensors are important in particular for mixed operation, in which goods carriers of different lengths are to be automatically loaded and transported in succession using an industrial truck. In particular for mixed operation, it has previously been presumed that the use of at least two cargo platform sensors spaced apart from one another in the longitudinal direction, of which one (the front cargo platform sensor) is responsible for the correct storage on the cargo platform and the other (the rear cargo platform sensor) is responsible for detecting the length of the goods carrier, is indispensable.

In addition, in mixed operation it typically occurs that on a storage surface for storing the goods carrier for automated transport, for example, in a "supermarket aisle", gaps between the goods carriers result upon storage of the shorter goods carriers (for example: 400 mm dolly), since the cargo platform is typically designed for the longer or longest transport material to be transported (for example for a 600 mm dolly). Moreover, sufficient space is to be kept available between the goods carriers for raising and lowering the cargo platform.

SUMMARY

Proceeding therefrom, the disclosure is based on the object of at least partially solving the disadvantages or problems described in conjunction with the prior art. In particular, in an industrial truck operable in an at least partially automated manner, which is also to be suitable for mixed operation in particular, with the highest possible level of operating safety at the same time, the storage area for storing goods carriers to be unloaded or loaded is to be reduced overall. In particular, the space required in supermarket aisles for storing goods carriers for automated transport is to be reduced.

These objects are achieved by the features of the disclosure. Advantageous embodiments result from the disclosure.

A method for transporting a goods carrier by means of an industrial truck operable in an at least partially automated manner contributes thereto, in which at least the following steps are carried out in an automated manner by the industrial truck:
  a) acquiring an item of information about the length of the goods carrier,
  b) checking the acquired information about the length of the goods carrier in relation to a total length of a cargo surface of a cargo platform of the industrial truck,
  c) carrying out a multistep loading process or unloading process, comprising at least reloading the goods carrier on the cargo platform if the length of the goods carrier is less than the total length of the cargo surface.

Steps a), b), and c) can be carried out, for example, at least once and/or repeatedly in the specified sequence to carry out the method. The method can be carried out, for example, by means of a control unit also described here and/or a system also described here and/or an industrial truck also described here. In the method, at least steps a), b), and c) can advantageously be carried out autonomously by the industrial truck.

The method is used in particular for transporting multiple goods carriers in mixed operation. Mixed operation typically describes here the operating mode in which goods carriers of different lengths are (to be) transported in succession in an automated manner using one (the same) industrial truck. The method advantageously contributes to the storage area for storing goods carriers to be unloaded or loaded being able to be reduced overall. For this purpose, for the first time a method is specified by which shorter goods carriers can advantageously be loaded via a loading-unloading-loading algorithm, which enables a (densest possible) concatenation of the goods carriers and thus an advantageous space utilization, for example, of a supermarket aisle. During the unloading in, for example, a supermarket aisle, an unloading-loading-unloading algorithm can advantageously enable an advantageous (densest possible) concatenation of goods carriers. According to one preferred embodiment of the method, a detection of the length of the goods carrier during the loading can furthermore be enabled by means of an existing safety sensor as a sensor device. A (previously typical) rear cargo platform sensor can thus advantageously be saved.

The industrial truck can be, for example, one as defined in EN 1525. The industrial truck can be configured for at least partially automated and/or autonomous (driving) operation. The industrial truck generally has a cargo platform. The cargo platform has a cargo surface on which a lower (but not necessarily lowest) side of the goods carrier can rest in the loaded state. Furthermore, the industrial truck can have a front structure. The front structure generally has an essentially vertical rear wall toward the cargo platform. In the region in which the cargo platform adjoins the rear wall or ends thereon, a cargo platform sensor of the industrial truck can be arranged. The cargo platform sensor is typically used to detect the correct storage of the goods carrier on the cargo platform. The cargo platform sensor can be, for example, an inductive sensor.

The goods carrier can be, for example, a trolley, in and/or on which transport materials can be stored, in particular for transport. The goods carrier can be equipped with at least two front wheels spaced apart from one another in the lateral direction and with at least two rear wheels spaced apart from one another in the lateral direction. The lateral distance of these wheels can be dimensioned in each case, for example, so that it is possible for the industrial truck to drive below the goods carrier, so that the goods carrier can be loaded on a cargo platform of the industrial truck (by driving under it). Corresponding goods carriers can generally also be referred to as a "dolly". The front wheels and the rear wheels furthermore generally have a specific distance in the longitudinal direction in relation to one another depending on the length of the goods carrier. The front wheels and the rear wheels can therefore be used here as a particularly advantageous identification means for the length of the goods carrier. Alternatively or cumulatively, (other) identification means can be provided on the goods carrier spaced apart at a specific distance from one another in the longitudinal direction, which can be acquired by the sensor device (explained in more detail below). For example, in this context at least one front identification means and at least one rear identification means can be provided. The longitudinal distance between the front identification means and the rear identification means can advantageously be characteristic for the type of the goods carrier and/or the length of the goods carrier.

The information about the length of the goods carrier can be, for example, the length of the goods carrier directly or an item of information which permits an inference about the length of the goods carrier. The information can be, for example, characteristic for a specific type of goods carrier. The embodiment can thus advantageously also contribute to a differentiation of which type of goods carrier (from a defined number of types of goods carriers) is to be loaded on the industrial truck. A differentiation between the two types 400 mm dolly (400 mm long goods carrier) and 600 mm dolly (600 mm long goods carrier) can particularly advantageously be performed in this context.

In step a), an item of information about the length of the goods carrier is acquired. The acquisition can comprise, for example, an ascertainment by means of a sensor device of the industrial truck or can at least make use of such an ascertainment. For example, during loading of a goods carrier, an ascertainment can be carried out according to steps i) to iii) described below to acquire the information. Furthermore, for example, during unloading of a goods carrier, an item of information ascertained during the loading of this goods carrier can be made use of, which can be read in, for example, from a memory of the industrial truck.

In step b), the acquired information about the length of the goods carrier is checked in relation to a total length of a cargo surface of a cargo platform of the industrial truck. In particular, it can be checked here whether the goods carrier is shorter than the total length of the cargo surface or not. (Alternatively or cumulatively) it can also be checked whether a specific type of goods carrier (for example 400 mm dolly) is loaded (or was driven under last) or is to be unloaded, of which it is known that it is shorter than the total length of a cargo surface.

In step c), a multistep loading process or unloading process is carried out, (each) comprising at least reloading the goods carrier on the cargo platform if the length of the goods carrier is less than the total length of the cargo surface. The reloading is also carried out in an automated manner by the industrial truck, for example, the reloading takes place solely by means of (driving and lifting) movements of the industrial truck.

According to one advantageous embodiment, it is proposed that at least the following steps are carried out in an automated manner by the industrial truck to ascertain the information about the length of the goods carrier:
  i) approaching an initial position predefined relative to the goods carrier, wherein reaching the initial position is detected by means of a sensor device of the industrial truck,
  ii) driving a predefined distance along the longitudinal direction of the goods carrier, starting from the initial position,
  iii) carrying out a further detection process by means of the same sensor device of the industrial truck after the predefined distance has been driven.

Steps i), ii), and iii) can be carried out, for example, at least once and/or repeatedly in the specified sequence. Steps i), ii), and iii) can advantageously be carried out autonomously by the industrial truck.

The sensor device can be arranged backward on the industrial truck and/or in the region of the rear end of the cargo platform. The sensor device is preferably configured to monitor at least one warning field and/or at least one protective field in the surroundings of the industrial truck, in particular behind the industrial truck, or to sample or scan it at least for this purpose, for example, by means of laser beams. The sensor device can (also) represent a safety sensor of the industrial truck or execute its functions. The sensor device can preferably be embodied as a laser scanner or comprise such a laser scanner. The sensor device is generally predominantly oriented to the rear or to the rear and to the sides (to the left side and the right side of the industrial truck). It can be provided here that the sensor device is not oriented upward. In particular, the industrial truck can be embodied here, for example, without a rear cargo platform sensor and/or such a sensor cannot be used in the acquisition according to the embodiment described here.

In step i), an initial position predefined relative to the goods carrier is approached, wherein reaching the initial position is detected by means of a sensor device of the industrial truck. The initial position can be predefined relative to the goods carrier, for example, in such a way that in this case it is the position in which at least one front identification means of the goods carrier, such as at least one front wheel of the goods carrier is located (presently or for the first time) in a warning field monitored by means of the sensor device. It can preferably be provided here that in this case both front wheels of the goods carrier are (or have to be) each located in one warning field (of two warning fields). These (two) warning fields can be placed, for example, at a rear end of a protective field facing away from the industrial truck, which is (also) monitored by means of the sensor device. The protective field is generally used here to change or even stop the further movement if an object is detected in the protective field. This means in other words in particular that the protective field represents a "harder" boundary for the operations of the industrial truck in comparison to the goods field.

In step ii), driving a predefined distance along the propagation direction takes place, starting from the initial position. The distance is generally predefined here so that it is suitable for being able to differentiate at least two types of goods carriers from one another, which differ from one another in their length along the longitudinal direction. To be able to drive the distance (unobstructed), it can possibly be advantageous to first switch over or change the protective field so as to be able to drive below the goods carrier (at all). In particular, the protective field can be switched to be narrower (in the lateral direction) for this purpose, so that the wheels of the goods carrier are not in the protective field (while driving below the goods carrier). Upon the switching over of the protective field, the warning fields can possibly move closer to the industrial truck. A distance difference thus possibly to be taken into consideration can be incorporated into the pre-definition of the distance or can also be taken into consideration in this case.

In step iii), a further detection process is carried out by means of the same sensor device of the industrial truck after the predefined distance has been driven. In particular, the distance is predefined so that in the case of a first (shorter) of the at least two types of goods carriers, in the detection process according to step iii), at least one rear identification means of the goods carrier, such as at least one rear wheel of the goods carrier is located (presently or for the first time) in the warning field monitored by means of the sensor device. It can preferably be provided that in this case both rear wheels of the goods carrier are (or have to be) each located in one warning field (of the two warning fields). Accordingly, upon driving below a second (longer) of the at least two types of goods carriers during the detection process according to step iii), no identification means of the goods carrier, in particular no (rear) wheel of the goods carrier, would be in the warning field monitored by means of the sensor device.

In a step iv), the detection process from step iii) can be evaluated, in particular to ascertain in dependence on the detection result from step iii) which type of goods carrier (of at least two types of goods carriers) is presently being driven below or loaded. It can be ascertained, for example, that presently a first (shorter) of the at least two types of goods carriers is being driven below or loaded, when the at least one rear identification means is detected after driving the predefined distance. Furthermore, it can be ascertained, for example, that presently a second (longer) of the at least two types of goods carriers is being driven below or loaded when no rear identification means is detected after driving the predefined distance. Alternatively or cumulatively, after step iii), the states of the warning fields can be stored as information for the further loading and unloading process. Furthermore, the type of goods carrier ascertained (during the loading) or the ascertained length of the goods carrier can be stored in a memory of the industrial truck until the unloading of the goods carrier. An item of information about the length of the goods carrier can accordingly be acquired for the unloading process by an access to this memory before the unloading.

According to one advantageous embodiment, it is proposed that steps i) to iii) be carried out during loading of the goods carrier on the industrial truck. To load the goods carrier on the industrial truck or on a cargo platform of the industrial truck, it is possible to drive at least a part of the industrial truck, such as the longitudinal section of the industrial truck having the cargo platform, below the goods carrier. This can advantageously contribute to various types of goods carriers (of different lengths) being able to be recognized (directly) during the loading of the goods carrier on the industrial truck.

According to a further advantageous embodiment, it is proposed that at least one warning field in the surroundings of the industrial truck is monitored by means of the sensor device. The sensor device preferably monitors at least two warning fields behind the or on the rear of the industrial truck. Furthermore, at least one protective field in the surroundings of the industrial truck can be monitored by means of the sensor device. In particular, a rear laser scanner (otherwise) provided for personal protection can (thus) be used as a sensor device, to enable the acquisition of the information about the extension (length) of the goods carrier and thus possibly a differentiation between at least two types of goods carriers (of different lengths) via additional warning fields which are switched and possibly evaluated at the same time as the (personal) protective field.

According to a further advantageous embodiment, it is proposed that the sensor device scans the at least one warning field by means of laser beams. In this context, the sensor device can be embodied, for example, as a laser scanner. In particular, it is a laser scanner which is (otherwise) also used for monitoring at least one (personal) protective field in the surroundings of the industrial truck, in particular behind the industrial truck.

According to a further advantageous embodiment, it is proposed that the reloading comprises at least two vertical movements of the cargo surface and driving a predefined distance along the longitudinal direction of the goods carrier. In this context, the cargo platform of the industrial truck can be embodied, for example, as a lift platform. The lift platform can be configured in particular to vertically raise and vertically lower the (entire) cargo surface. In particular, the reloading comprises at least two vertical movements of the cargo surface in the same direction. The distance is generally predefined here so that it is suitable for reloading a goods carrier which is shorter than the total length of the cargo surface on the cargo surface from rear to front (loading process) or from front to rear (unloading process). The predefined distance can correspond to a length difference between a shorter of the goods carriers (for example: 400 mm dolly) and a longer of the goods carriers (for example: 600 mm dolly).

Furthermore, the sensor device can also be used to place the goods carrier to be unloaded as close as possible in front of a further goods carrier during an unloading process, in particular after reloading on the cargo surface. The industrial truck with the (still) loaded goods carrier can move back or drive in reverse, for example, until at least a part of the further goods carrier, for example its wheels (front wheels or rear wheels) are in at least one warning field. To arrange the goods carriers in a particularly space-saving manner, it can furthermore be provided that the reverse driving is continued by a distance which is used to compensate for the length of the warning field.

According to a further aspect, a computer program is proposed for carrying out a method described here. In other words, this relates in particular to a computer program (product), comprising commands which, upon execution of the program by a computer, prompt this computer to carry out a method described here.

According to a further aspect, a machine-readable storage medium is also proposed, on which the computer program is stored. The machine-readable storage medium is generally a computer-readable data carrier.

According to a further aspect, a control unit is also proposed for an industrial truck operable in an at least partially automated manner, wherein the control unit is configured to carry out a method described here. The control unit (controller) can comprise, for example, a computer which can execute commands to carry out the method. For this purpose, the computer or the control unit can execute, for example, the specified computer program. For example, the computer or the control unit can access the specified storage medium to be able to execute the computer program.

According to a further aspect, an industrial truck operable in an at least partially automated manner having the control unit is also proposed. Alternatively or cumulatively, this can also be described as an industrial truck operable in an at least partially automated manner which is configured to carry out a method described here. The industrial truck is additionally generally configured for an at least partially automated or autonomous (driving) operation.

In summary, a particularly advantageous embodiment of the solution described here can also be described in other words in particular (and possibly alternatively) as an industrial truck operable in an at least partially automated manner (autonomous transport vehicle), which is configured to be able to transport short and long goods carriers (dollies) alternately. Short goods carriers are also to be able to be positioned as close as possible to the rear wall of the industrial truck, in particular so that the detection of the loading state functions as reliably as possible. Due to the length of the cargo platform, however, it is typically not possible to drive completely below the short dollies. Therefore, after detecting a short dolly during loading, a transposition process (on the cargo platform) is advantageously triggered. Vice versa, a transposition process (on the cargo platform) can also be used during unloading.

The details, features, and advantageous embodiments explained in conjunction with the method can accordingly also occur in the computer program provided here and/or the storage medium and/or the control unit and/or the industrial truck and vice versa. Reference is thus made to the statements there in their entirety for the more detailed characterization of the features.

BRIEF DESCRIPTION OF THE DRAWINGS

The solution provided here and its technical environment are explained in more detail hereinafter on the basis of the figures. It is to be noted that the disclosure is not to be restricted by the exemplary embodiments shown. In particular, if not explicitly indicated otherwise, it is also possible to extract partial aspects of the substantive matter explained in the figures and combine them with other components and/or findings from other figures and/or the present description. In the exemplary and schematic figures.

DETAILED DESCRIPTION

Figure 1:
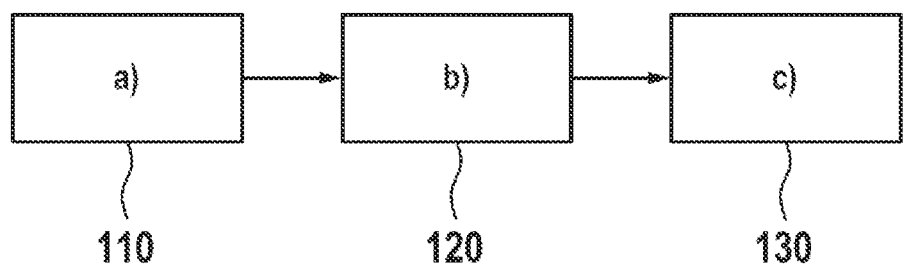
FIG. 1: shows an exemplary sequence of the method provided here.

FIG. 1 schematically shows an exemplary sequence of the method provided here. The method is used for transporting a goods carrier 1 (cf. FIGS. 3-6) by means of an industrial truck 2 operable in an at least partially automated manner (cf. FIG. 2). The sequence of steps a), b), and c) illustrated by the blocks 110, 120, and 130 is exemplary and can be carried out, for example, at least once in the illustrated sequence in an automated manner by the industrial truck 2 to carry out the method.

In block 110, an item of information about the length 3 of the goods carrier 1 is acquired according to step a). In block 120, the acquired information about the length 3 of the goods carrier 1 is checked in relation to a total length 4 of a cargo surface 5 of a cargo platform 6 of the industrial truck 2 according to step b). In block 130, a multistep loading process or unloading process is carried out according to step c), comprising at least reloading the goods carrier 1 on the cargo platform 6 if the length 3 of the goods carrier 1 is less than the total length 4 of the cargo surface 5.

Figure 2:
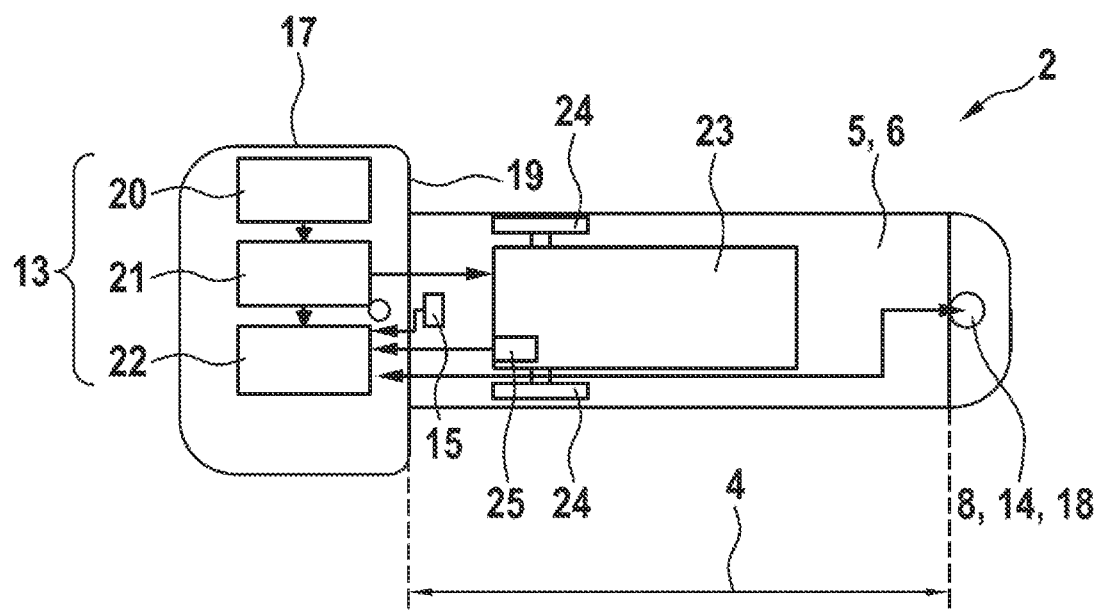
FIG. 2: shows an embodiment of the industrial truck described here in a sectional illustration.

FIG. 2 schematically shows an exemplary embodiment of the industrial truck 2 described here in a sectional illustration. The industrial truck 2 is configured for an at least partially automated or autonomous (driving) operation. Furthermore, the industrial truck 2 is configured to carry out a method described here. For this purpose, the industrial truck 2 has, for example, a control unit 13 also described here and preferably a sensor device 8, which is connectable or connected to the control unit 13 for data transfer. The control unit 13 is configured to carry out the described method.

The industrial truck 2 has a front structure 17 and a cargo platform 6. The cargo platform 6 has a cargo surface 5, with which a goods carrier 1 can be brought into contact. The cargo platform 6 can be formed as a lift platform, so that the cargo surface 5 can be vertically moved. The front structure 17 has an essentially vertical rear wall 19 toward the cargo platform 6. In the region in which the cargo platform 6 adjoins the rear wall 19 or ends thereon, for example, a cargo platform sensor 15 of the industrial truck 3 is arranged. This region is generally at the front end of the cargo platform 6. The cargo platform sensor 15 is typically used to detect the correct storage of the goods carrier 1 on the cargo platform 6. The storage of the goods carrier 1 is correct in particular if the goods carrier 1 is arranged sufficiently close to the rear wall 19. The cargo platform sensor 15 can be an inductive sensor, for example. Furthermore, the cargo platform sensor 15 can be oriented upward.

Furthermore, the industrial truck 2 has here, for example, a sensor device 8 in the region of the rear end of the cargo platform 6. The sensor device 8 is generally configured to monitor at least one warning field 11 and/or at least one protective field 16 in the surroundings of the industrial truck 2, in particular behind the industrial truck 2, or, for example, to sample or scan it at least for this purpose, by means of laser beams. The actual monitoring can then be carried out, for example, by the control unit 13 or a comparable device of the industrial truck 2. The sensor device 8 can thus (also) represent a safety sensor 18 of the industrial truck 2. The sensor device 8 can preferably be embodied as a laser scanner 14 or can comprise such a laser scanner. The sensor device 8 is generally oriented predominantly to the rear or to the rear and to the sides (to the left side and the right side of the industrial truck 2). It can be provided here that the sensor device 8 is not oriented upward. Furthermore, it can be seen in FIG. 2 that the industrial truck 2 is embodied here without a rear cargo platform sensor, for example, since this sensor can advantageously be saved here.

The control unit 13 comprises here, for example, a robot control module 20 (abbreviated: RCU), a motion control module 21 (abbreviated MCU), and a safety control module 22 (abbreviated SCU). The robot control module 20 specifies here, for example, the desired travel direction and the speed to the motion control module 21. The motion control module 21 furthermore, for example, specifies the desired travel direction to the safety control module 22, calculates the target speeds, and specifies these to a motor device 23 of the industrial truck 2. The motor device 23 can have one or more (electric) motors, which are operationally connected, possibly via a transmission or directly to driven wheels 24 of the industrial truck 2, possibly in terms of individually driven wheels 24.

Furthermore, the industrial truck 2 can have one or more rotational speed encoders 25 (for example, SIL2 rotational encoders), which transmit the actual rotational speeds of the motors 23 or wheels 24 to the safety control module 22. The safety control module 22 can calculate here, for example, from the actual rotational speeds, the travel distance or the covered distance (secure wheel odometry) and/or, in particular in dependence on the desired travel direction, switch the corresponding at least one warning field 11 and/or at least one protective field 16 (laser scanner field).

To carry out one advantageous embodiment of the method, the control unit 13 can be configured, for example, for the following procedure: While a goods carrier 1 is approached (cf. FIG. 3), the safety control module 22 switches two warning fields 11 and one protective field 16, which are monitored by means of the sensor device 8 (laser scanner 14 here, for example). The two warning fields 11 are switched behind the protective field 16 and with a (predefinable) lateral distance from one another such that they can simultaneously acquire two front wheels 26 of the goods carrier 1 (with (only) one of the front wheels 26 in each of the warning fields 11). The approach process is thus continued until the safety control module 22 detects that the two warning fields 11 trigger (dolly detection). The position reached in this case is also referred to as the initial position 7 (cf. FIG. 4). This represents an example that and possibly how according to step i) an approach of an initial position 7 predefined relative to the goods carrier 1 can take place, wherein reaching the initial position 7 is detected by means of a sensor device 8 of the industrial truck 2.

Figure 5:
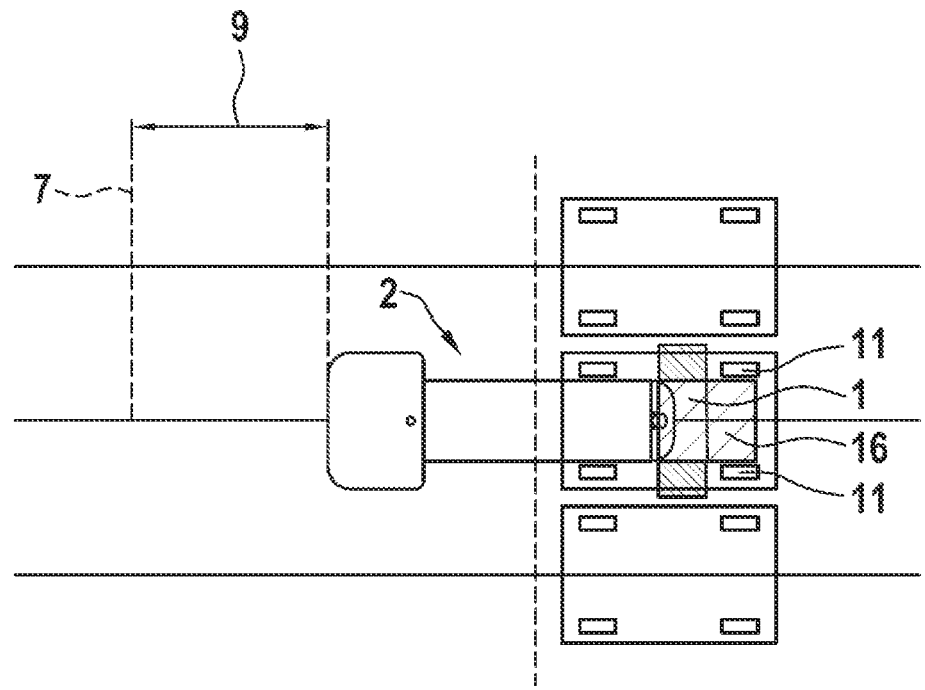

The safety control module 22 can then switch the sensor device 8 over to a narrower protective field 16, wherein possibly the (longitudinal) position of the warning fields 11 can move toward the industrial truck 2 (cf. FIG. 5). With this configuration, the loading process can be continued in the longitudinal direction 10 of the goods carrier 1 to drive a predefined distance 9, starting from the initial position 7. This represents an example that and possibly how according to step ii) driving a predefined distance 9 can take place along the longitudinal direction 10, starting from the initial position 7.

After the distance 9 has been covered, the safety control module 22 can again evaluate the present or then current acquisition of the sensor device 8 within the two warning fields 11. This represents an example that and possibly how according to step iii) a further detection process can be carried out by means of the same sensor device 8 of the industrial truck 2 after the predefined distance 9 has been driven. If no acquisition in the warning fields 11 is detected in this state or at least no acquisition of further wheels, in particular rear wheels 27 of the goods carrier 1 is detected, it can thus be inferred that a longer goods carrier 1 (600 mm dolly here) is being loaded (cf. FIG. 5). If an acquisition in the warning fields 11, in particular an acquisition of further wheels, in particular rear wheels 27 of the goods carrier 2, is detected in this state, it can thus be inferred that a shorter goods carrier 2 (400 mm dolly here) is being loaded (cf. FIG. 6).

In the course of a loading process, the states of the two warning fields 11 can thus advantageously be used to differentiate between different goods carriers 1, in particular between 400 mm and 600 mm dollies. The described advantageous embodiment of the method represents an example of the process that can be used to ascertain the information about the length 3 of the goods carrier 1. This information can be used, for example, in step a).

FIGS. 3 to 6 show by way of example and schematically an advantageous application of a first part of the method described here in a top view. FIGS. 3 to 6 illustrate a particularly advantageous embodiment for ascertaining the information about the length 3 of the goods carrier 1, which can be used in step a) to acquire the information about the length 3 of the goods carrier 1. For example, a sequence possible using the method of a loading situation in, for example, a supermarket is shown. This also represents an example that and possibly how steps i) to iii) can be carried out during loading of the goods carrier 1 on the industrial truck 2.

Figure 3:
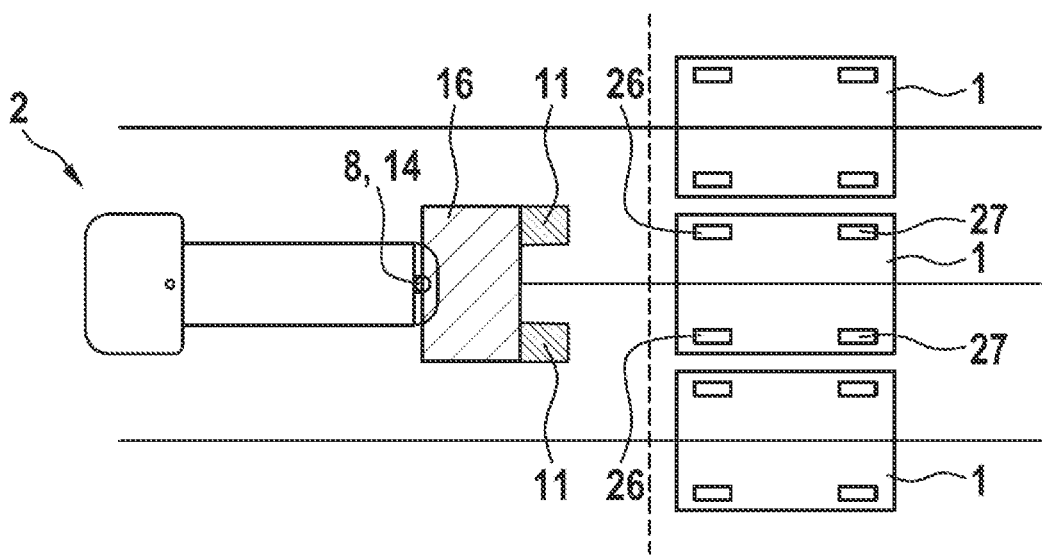
FIGS. 3-6: show an advantageous application of a first part of the method described here in a top view.
Figure 4:
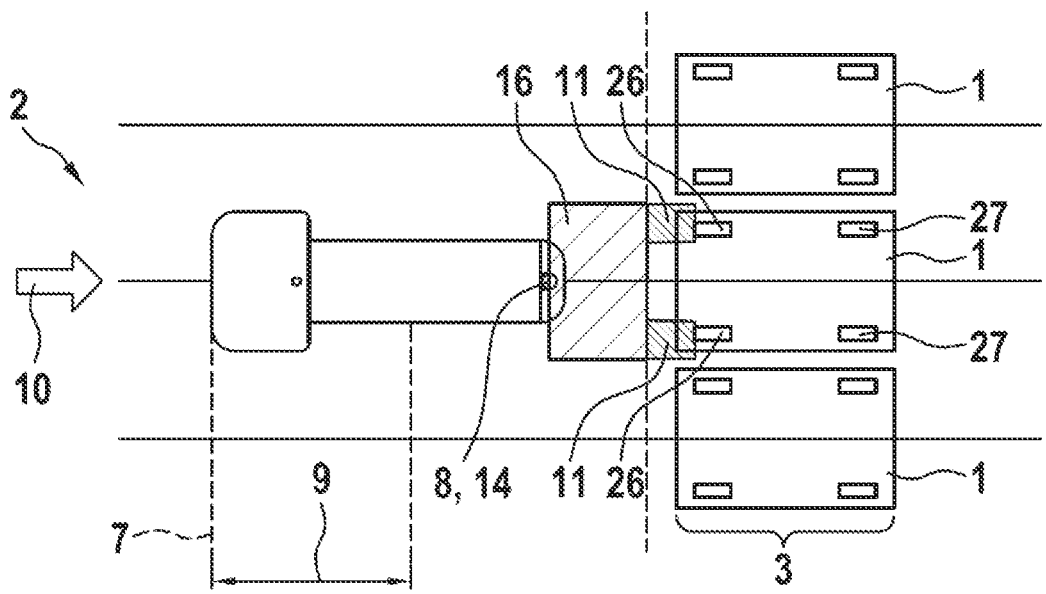

It is shown here in FIGS. 3 and 4 that the industrial truck 2 can scan or monitor the region located behind it using the sensor device 8 (rear-directed laser scanner 14) during the entry into a supermarket. The solid lines represent exemplary supermarket aisles, on which typically multiple goods carriers can also be in succession in the longitudinal direction 10. When approaching a goods carrier 1, two warning fields 11 can independently of one another detect the respective left and right (front) wheel 26 (or wheel 26 of the front axle) of the goods carrier 1 to be picked up (floor roller or dolly here, for example). This therefore also describes an example that and possibly how the sensor device 8 can monitor at least one warning field 11, in particular two warning fields 11 here in the surroundings of the industrial truck 2. The sensor device 8 can scan the warning fields 11 by means of laser beams here, for example.

Figure 6:
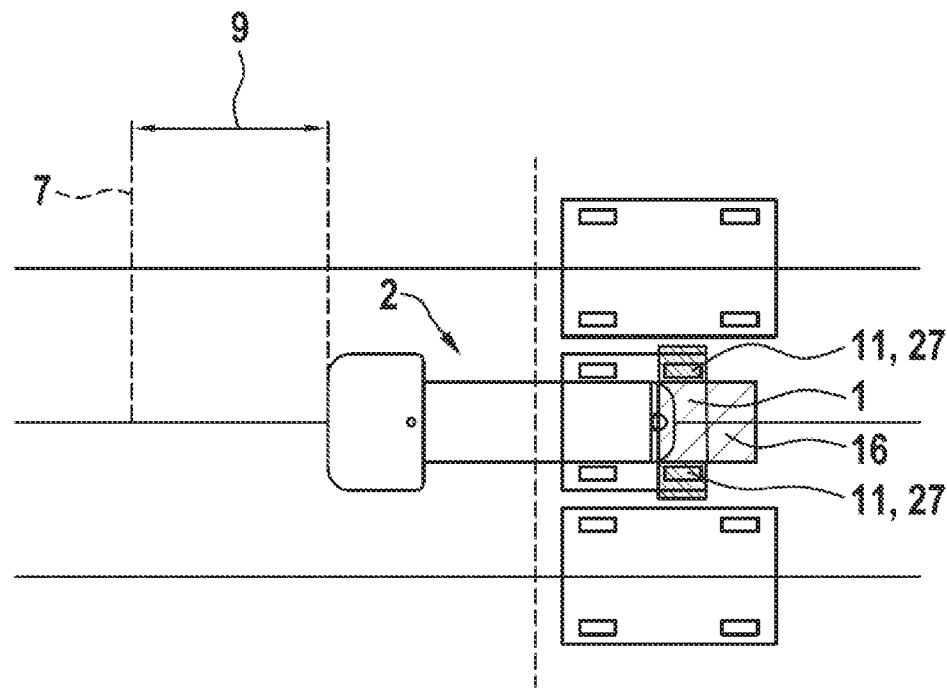

FIGS. 5 and 6 show that after successful detection of the front wheels 26, the laser scanner 14 can be switched over to a narrower protective field 16 and thus the predefined distance 9 can be traveled, which is suitable here, for example, in particular to differentiate a 600 mm dolly (FIG. 5: the warning fields 11 are free) and a 400 mm dolly (FIG. 6: the warning fields 11 detect the rear wheels 27 or wheels 27 of the second dolly axle). At this moment, the safety control module 22 can (again) query the states of the warning fields 11 of the laser scanner 14 and preferably store them as information for the further loading and unloading process. This information can be read in, for example, in step a) to acquire the information about the length 3 of the goods carrier 1.

Figure 7:
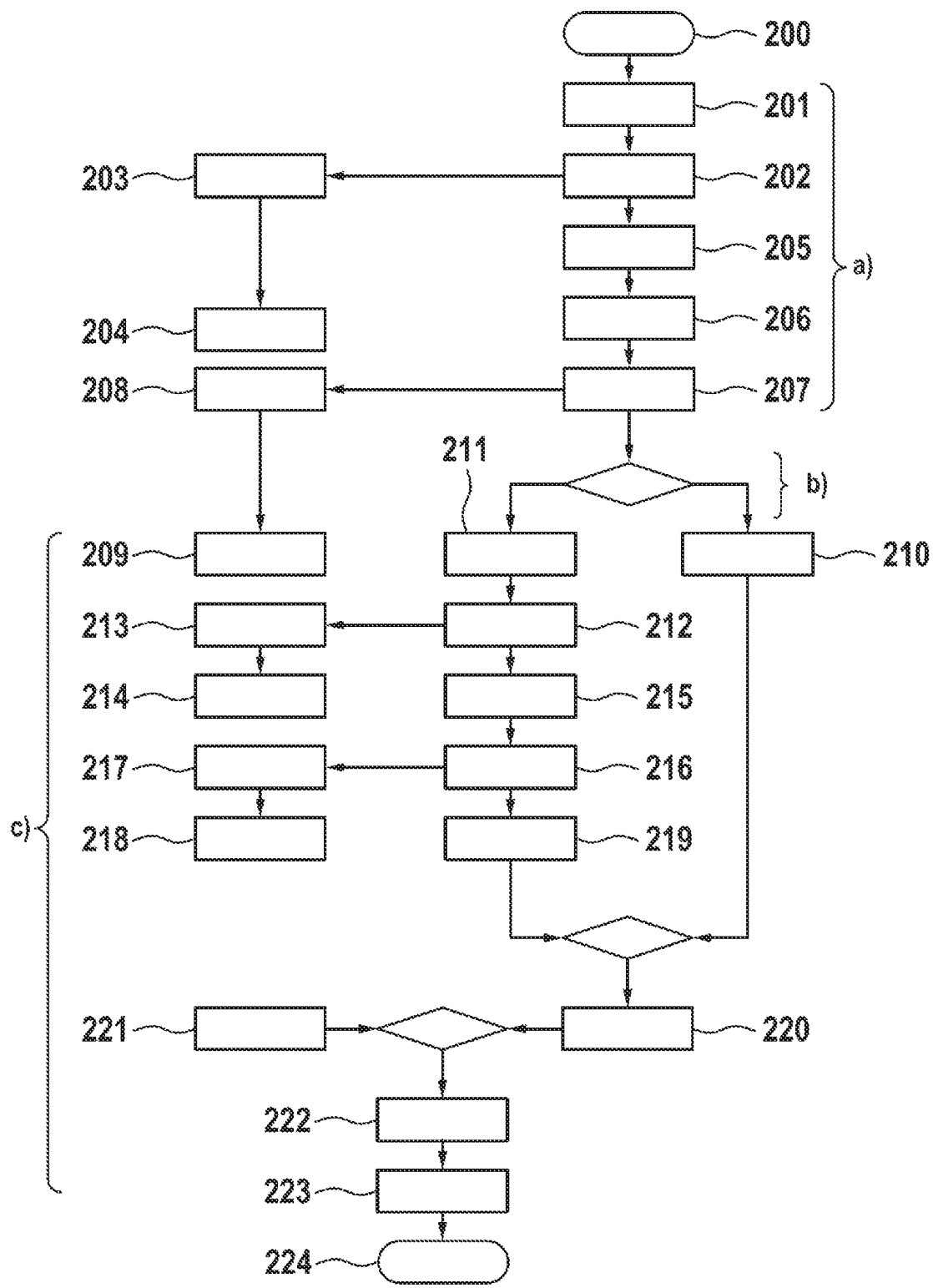
FIG. 7: shows an exemplary sequence of the method provided here during a loading process.

FIG. 7 shows by way of example and schematically an exemplary sequence of the method provided here during a loading process. The example shown is described on the basis of a flow chart having blocks 200 to 224. In block 200, the industrial truck 2 drives into a supermarket, for example, and an exemplary loading process starts.

In block 201, reverse driving of the industrial truck 2 starts, during which the distance covered is monitored.

In block 202, a query of the warning fields 11 of the rear laser scanner 8, 14 takes place. In block 203, a reset of the value for monitoring the distance covered takes place. In block 204, monitoring of the covered travel distance takes place. In particular, two warning fields 11 (left and right wheel 26 of the front axle of the goods carrier 1 to be picked up) can report, for example, via digital outputs to the control unit 13 (SPS), that the detection of the two fields has hit. The distance for the monitoring of the covered distance is reset in this case.

In block 205, switching over to narrower protective field 16 takes place. In block 206, the reverse driving is continued for a defined length. This can be, for example, the wheelbase between front axle and rear axle of a shorter goods carrier 1 (dolly), which is in particular 400 mm long. This also represents an example of the pre-definition of the distance 9. In block 207, a (further) query of the warning fields takes place. The Boolean value (400 mm dolly rear axle found, or not), for example, is stored in a memory, for example, a flip-flop memory here.

If it is a 400 mm goods carrier 1, in particular two warning fields 11 (left and right wheel 27 of the rear axle of a 400 mm goods carrier) report via digital outputs to the control unit 13 (SPS) that the detection of the two fields has hit (cf. FIG. 6). If it is a 600 mm goods carrier 1, the rear axle is still outside the acquisition range of the warning fields 11 after the traveled distance 9 (cf. FIG. 5).

In block 208, a reset of the value for monitoring the covered distance takes place. In block 209, monitoring of the covered travel distance takes place. The travel distance can orient itself to the length of the cargo surface 5 (lifting surface) and of the goods carrier 1 (ground roller). The industrial truck 2 can drive below the goods carrier 1 here until the rear edge of the cargo platform 6 protrudes slightly beyond the rear edge of the goods carrier 1.

After block 207, a case differentiation takes place. If the query in block 207 was positive (400 mm dolly rear axle was found), the sequence continues with block 211. If the query in block 207 was negative, the sequence continues with block 210. In block 210, the reverse driving is continued for a defined length. The length can orient itself here, for example, to the wheelbase between the front axle and the rear axle of a 600 mm dolly.

In block 211, the reverse driving is continued for a defined length. The length can orient itself here, for example, to the wheelbase between the front axle and the rear axle of a 400 mm dolly. In block 212, a standstill of the industrial truck 2 and raising of the cargo surface 5 (lift platform) take place. In block 213, a reset of the value for monitoring the covered distance takes place. In block 214, monitoring of the covered travel distance takes place. The travel distance can orient itself here to required space for renewed loading of the shorter, in particular 400 mm long goods carrier 1. No further goods carrier (arranged in the longitudinal direction or in an aisle behind it) is to be picked up here.

In block 215, forward driving takes place for a/the defined travel distance. In block 216, a standstill of the industrial truck 2 and lowering of the cargo surface 5 (lift platform) take place. In block 217, a reset of the value for monitoring the covered distance takes place. In block 218, monitoring of the covered travel distance takes place. The travel distance can orient itself here to the length of the cargo surface 5 and the goods carrier 1.

In block 219, reverse driving takes place for a defined travel distance. In block 220, reverse driving takes place at greatly reduced speed (for example 0.05 m/s). In other words, the industrial truck is in the mode of the slow reverse driving in block 220. In block 221, monitoring of the sensor value for cargo detection (cargo platform sensor 15) takes place. The cargo platform sensor 15 for the cargo detection reports the detection of the goods carrier 1 when it has in particular approached sufficiently close to the rear wall 19.

In block 222, the reverse driving at greatly reduced speed is ended. In block 223, a standstill of the industrial truck 2 and raising of the cargo surface 5 (lift platform) take place. In block 224, the loading process is terminated.

Figure 8:
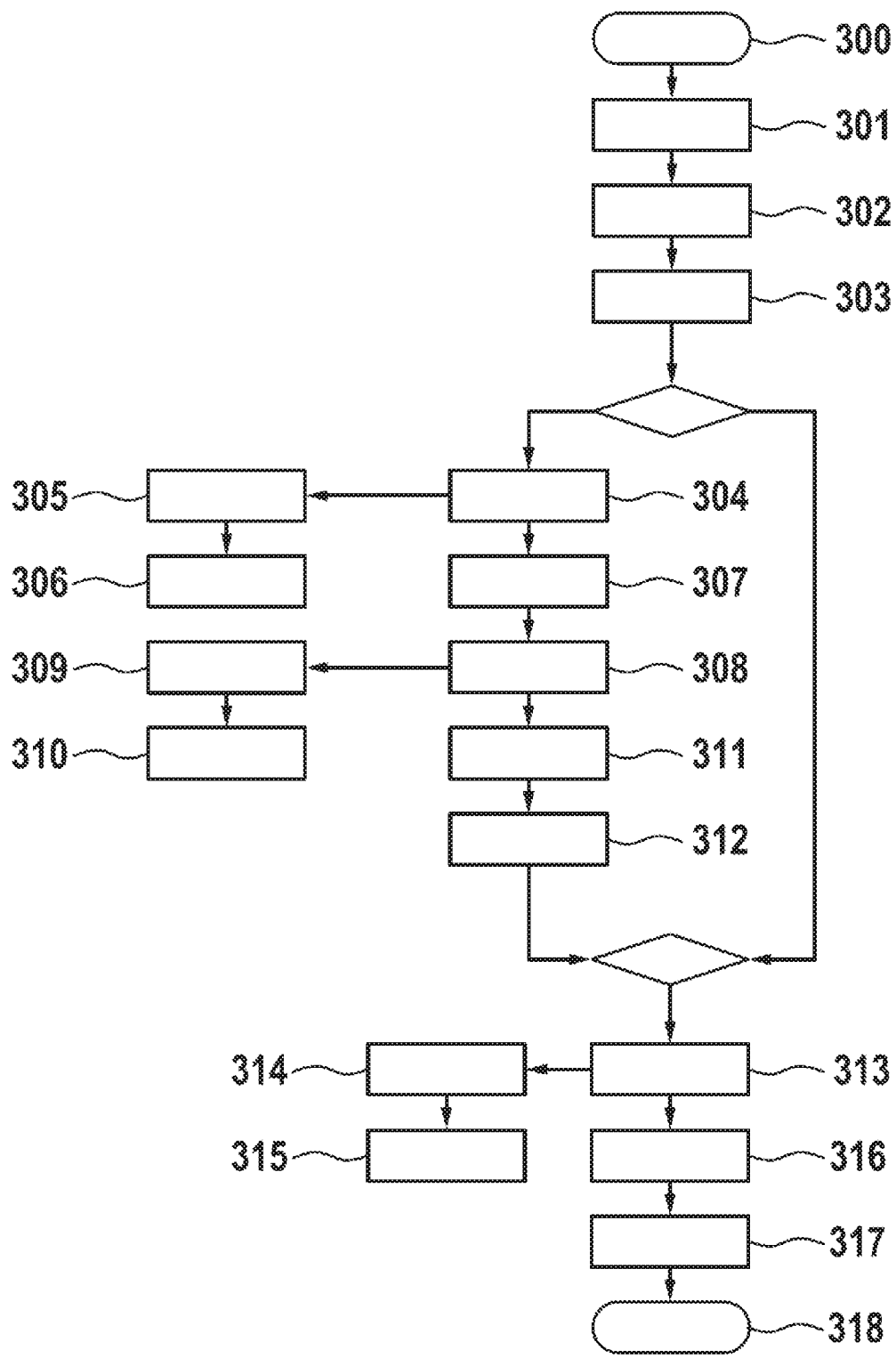
FIG. 8: shows an exemplary sequence of the method provided here during an unloading process.

FIG. 8 shows by way of example and schematically an exemplary sequence of the method provided here during an unloading process. The example shown is described on the basis of a flow chart having blocks 300 to 318. In block 300, for example, the industrial truck 2 drives into a supermarket and an exemplary unloading process starts.

In block 301, reverse driving starts, during which the covered distance is monitored.

In block 302, a query of the warning fields 11 of the rear scanner 14 takes place. Two warning fields 11 (left and right wheel 26 of the front axle of a goods carrier 1 already present in the supermarket aisle) report via digital outputs to the control unit 13 (SPS), that the detection of the two fields 11 has hit. The distance for the monitoring of the covered distance is reset.

In block 303, a query of the Boolean value (400 mm dolly rear axle found, or not) takes place from, for example, a memory (for example a flip-flop memory). After block 303, a case differentiation takes place. If the query in block 303 was positive (400 mm dolly rear axle was found during prior loading), the sequence continues with block 304. If the query in block 303 was negative, the sequence continues with block 313.

In block 304, a standstill of the industrial truck 2 and lowering of the cargo surface 5 (lift surface) take place. In block 305, a reset of the value for monitoring the covered distance takes place. In block 306, monitoring of the covered distance takes place. The travel distance is oriented here to the length difference between a shorter of the goods carriers 1 (for example: 400 mm dolly) and a longer of the goods carriers 1 (for example: 600 mm dolly).

In block 307, forward driving takes place for a/the defined travel distance. In block 308, a standstill of the industrial truck 2 and raising of the cargo surface 5 (lift platform) take place. In block 309, a reset of the value for monitoring the covered distance takes place. In block 310, monitoring of the covered distance takes place.

In block 311, reverse driving takes place at normal speed (for example 0.1 m/s). In block 312, a query of the warning fields 11 of the rear laser scanner 14 takes place. Two warning fields 11 (left and right wheel of the front axle of a goods carrier 1 already present in the supermarket aisle) can report here via digital outputs to the control unit 13 that the detection of the two fields 11 has hit. The distance for the monitoring of the covered distance is reset.

In block 313, reverse driving takes place at greatly reduced speed (for example 0.05 m/s). In other words, the industrial truck is in the module of the slow reverse driving in block 313. In block 314, a reset of the value for monitoring the covered distance takes place. In block 315, monitoring of the covered distance takes place. The travel distance can orient itself here to the length of the rear warning fields 11. The goods carriers 1 are thus to be placed against one another or one behind another in the most space-saving manner possible, but as much as possible without touching one another.

In block 316, reverse driving takes place for a defined travel distance. In block 317, a standstill of the industrial truck 2 and lowering of the cargo surface 5 (lift platform) take place. In block 318, the loading process is terminated.

In particular blocks 212, 215, 216, and 223 or 304, 307, 308, and 317, respectively, represent examples that and possibly how the reloading can comprise at least two vertical movements of the cargo surface 5 and driving a predefined distance along the longitudinal direction 10 of the goods carrier 1.

LIST OF REFERENCE NUMERALS 1 goods carrier
2 industrial truck
3 length
4 total length
5 cargo surface
6 cargo platform
7 initial position
8 sensor device
9 distance
10 longitudinal direction
11 warning field
13 control unit
14 laser scanner
15 cargo platform sensor
16 protective field
17 front structure
18 safety sensor
19 rear wall
20 robot control module
21 motion control module
22 safety control module
23 motor device
24 wheel
25 rotational speed encoder
26 front wheel
27 rear wheel

What is claimed is:

1. A method for transporting a goods carrier with an industrial truck that is operated in an at least partially automated manner, the method comprising:
   a) acquiring, in an automated manner with the industrial truck, an item of information about a length of the goods carrier;
   b) checking, in an automated manner with the industrial truck, the acquired information about the length of the goods carrier in relation to a total length of a cargo surface of a cargo platform of the industrial truck; and
   c) performing, in an automated manner with the industrial truck, one of a multistep loading process and a multistep unloading process, which at least includes reloading the goods carrier on the cargo platform in response to the length of the goods carrier being less than the total length of the cargo surface,
   wherein the acquiring the item of information about the length of the goods carrier comprises (i) approaching, in an automated manner with the industrial truck, an initial position that is predefined relative to the goods carrier, a sensor device of the industrial truck being configured to detect when the initial position is reached, (ii) driving, in an automated manner with the industrial truck, a predefined distance along a longitudinal direction of the goods carrier, starting from the initial position, and (iii) performing, in an automated manner with the industrial truck, a further detection process using the sensor device of the industrial truck after the predefined distance has been driven, and
   wherein the method further comprises differentiating between a first goods carrier having a first length and a second goods carrier having a second length that is different from the first length, based on the further detection process using the sensor device after the industrial truck drives the predefined distance.

2. The method according to claim 1, wherein the i) approaching the initial position, the ii) driving the predefined distance, and the iii) performing the further detection process are carried out during a loading of the goods carrier on the industrial truck.

3. The method according to claim 1 further comprising: monitoring at least one warning field in a surroundings of the industrial truck using the sensor device.

4. The method according to claim 3, the monitoring further comprising:
   scanning, with the sensor device, the at least one warning field using laser beams.

5. The method according to claim 4, wherein the sensor device is configured to determine when at least one wheel of the goods carrier is located in the at least one warning field.

6. The method according to claim 1, the reloading the goods carrier on the cargo platform further comprising:
   performing at least two vertical movements of the cargo surface; and
   driving, with the industrial truck, the predefined distance along the longitudinal direction of the goods carrier.

7. The method according to claim 1, wherein the method is carried out by a computer program.

8. The method according to claim 7, wherein the computer program is stored on a non-transitory machine-readable storage medium.

9. The method according to claim 1, wherein:
   the second length is greater than the first length, and
   the predefined distance is greater than the first length and less than the second length.

10. A controller for an industrial truck that is operated in an at least partially automated manner, for transporting a goods carrier with the industrial truck, the controller being configured to:
   a) acquire, in an automated manner, an item of information about a length of the goods carrier;
   b) check, in an automated manner, the acquired information about the length of the goods carrier in relation to a total length of a cargo surface of a cargo platform of the industrial truck; and
   c) perform, in an automated manner, one of a multistep loading process and a multistep unloading process, which at least includes reloading the goods carrier on the cargo platform in response to the length of the goods carrier being less than the total length of the cargo surface,
   wherein the acquiring the item of information about the length of the goods carrier comprises (i) approaching, in an automated manner with the industrial truck, an initial position that is predefined relative to the goods carrier, a sensor device of the industrial truck being configured to detect when the initial position is reached, (ii) driving, in an automated manner with the industrial truck, a predefined distance along a longitudinal direction of the goods carrier, starting from the initial position, and (iii) performing, in an automated manner with the industrial truck, a further detection process using the sensor device of the industrial truck after the predefined distance has been driven, and
   wherein the controller is further configured to differentiate between a first goods carrier having a first length and a second goods carrier having a second length that is different from the first length, based on the further detection process using the sensor device after the industrial truck drives the predefined distance.

11. The controller according to claim 10, wherein the reloading the goods carrier on the cargo platform further comprises (i) performing at least two vertical movements of the cargo surface, and (ii) driving, with the industrial truck, the predefined distance along the longitudinal direction of the goods carrier.

12. The controller according to claim 10, wherein:
the second length is greater than the first length, and
the predefined distance is greater than the first length and less than the second length.

13. The controller according to claim 10, wherein the i) approaching the initial position, the ii) driving the predefined distance, and the iii) performing the further detection process are carried out during a loading of the goods carrier on the industrial truck.

14. The controller according to claim 10, wherein the controller is further configured to monitor at least one warning field in a surroundings of the industrial truck using the sensor device.

15. The controller according to claim 14, the monitoring further comprises scanning, with the sensor device, the at least one warning field using laser beams.

16. An industrial truck that is operated in an at least partially automated manner and transports a goods carrier, the industrial truck comprising:
a controller configured to a) acquire, in an automated manner, an item of information about a length of the goods carrier, b) check, in an automated manner, the acquired information about the length of the goods carrier in relation to a total length of a cargo surface of a cargo platform of the industrial truck, and c) perform, in an automated manner, one of a multistep loading process and a multistep unloading process, which at least includes reloading the goods carrier on the cargo platform in response to the length of the goods carrier being less than the total length of the cargo surface,
wherein the acquiring the item of information about the length of the goods carrier comprises (i) approaching, in an automated manner with the industrial truck, an initial position that is predefined relative to the goods carrier, a sensor device of the industrial truck being configured to detect when the initial position is reached, (ii) driving, in an automated manner with the industrial truck, a predefined distance along a longitudinal direction of the goods carrier, starting from the initial position, and (iii) performing, in an automated manner with the industrial truck, a further detection process using the sensor device of the industrial truck after the predefined distance has been driven,
wherein the controller is further configured to monitor at least one warning field in a surroundings of the industrial truck using the sensor device by scanning, with the sensor device, the at least one warning field using laser beams, and
wherein the sensor device is configured to determine when at least one wheel of the goods carrier is located in the at least one warning field.

17. The industrial truck according to claim 16, wherein the controller is further configured to differentiate between a first goods carrier having a first length and a second goods carrier having a second length that is different from the first length, based on the further detection process using the sensor device after the industrial truck drives the predefined distance.

18. The industrial truck according to claim 17, wherein:
the second length is greater than the first length, and
the predefined distance is greater than the first length and less than the second length.

* * * * *